United States Patent [19]
Martinitz et al.

[11] Patent Number: 5,575,307
[45] Date of Patent: Nov. 19, 1996

[54] DEVICE FOR THE DISPOSAL OF LIQUID MEDIA

[75] Inventors: Hans-Peter Martinitz, Kuchen; Klaus Santler, Esslingen-weil, both of Germany

[73] Assignee: F&F Filter- Und Fordertechnik GmbH, Ostfildern, Germany

[21] Appl. No.: 511,234

[22] Filed: Aug. 4, 1995

[30] Foreign Application Priority Data

Oct. 8, 1994 [DE] Germany .......................... 44 36 003.7

[51] Int. Cl.⁶ ................... F17D 1/14; F17D 3/16
[52] U.S. Cl. ................ 137/205; 137/571; 137/582; 184/6.14; 210/168
[58] Field of Search ................... 137/205, 567, 137/571, 582; 184/6.14; 210/168

[56] References Cited

U.S. PATENT DOCUMENTS

| | | | |
|---|---|---|---|
| 2,600,299 | 6/1952 | Johannes | 137/205 |
| 4,275,731 | 6/1981 | Nichols | 137/205 X |
| 4,325,663 | 4/1982 | Lee | 210/168 |
| 5,223,156 | 6/1993 | Maier | 137/571 X |

FOREIGN PATENT DOCUMENTS

0593005A1  4/1994  European Pat. Off. .

*Primary Examiner*—Gerald A. Michalsky
*Attorney, Agent, or Firm*—Evenson McKeown Edwards & Lenahan, PLLC

[57] ABSTRACT

In a device for the disposal of liquid media, such as cooling-lubricating liquids containing production residue, such as chips from industrial processes, wherein these media can be returned via at least one pipe line to a return reservoir and from there through a pipe line connected near the bottom to at least one collecting tank by means of at least one return pump, it is intended to prevent deposits of production residue in the return reservoir and to clean it. This is accomplished in that the return reservoir has the approximate shape of a standing circular cylinder, in which at least one pipe line supplying liquid media terminates approximately tangentially. Because of this a circulating flow of the liquid media is generated in the return reservoir, which cleans the interior wall of the return reservoir and prevents the deposit of production residues.

19 Claims, 1 Drawing Sheet

5,575,307

DEVICE FOR THE DISPOSAL OF LIQUID MEDIA

BACKGROUND AND SUMMARY OF THE INVENTION

The invention relates to a device for the disposal of liquid media, such as cooling-lubricating liquids containing production residue, such as chips from industrial processes, wherein these media can be returned via at least one pipe line to a return reservoir and from there through a pipe line connected near the bottom to at least one collecting tank by means of at least one return pump.

In a known device of this type (EP Patent Publication EP 0 593 005 A1), a rectangular return reservoir with a flat bottom inclined toward one side is provided. A pipe line bringing in liquid media terminates in the area of the higher end of the bottom of the return reservoir, while a pipe line leading to a collecting tank is connected to the area of the lower end of the bottom of the return reservoir. Spray nozzles are provided just above the bottom near the higher end of the return reservoir, are directed toward the lower end of the bottom of the return reservoir and liquid media flows out of them. It is disadvantageous here that deposits of production residue in the return reservoir can only be prevented by the inclination of the bottom and the additional employment of liquid media emerging through the spray nozzles.

It is an object of the invention to prevent deposits of production residue in the return reservoir in a less elaborate manner and to clean the return reservoir at the same time.

This object is attained in preferred embodiments of the invention by providing a device of the type mentioned at the outset wherein the return reservoir has the approximate shape of a standing circular cylinder, in which at least one pipe line supplying liquid media terminates approximately tangentially. Because of this arrangement, a circulating flow of the liquid media is generated in the return reservoir, which cleans the interior wall of the return reservoir and prevents the deposit of production residues.

To achieve this effect also on the bottom of the return reservoir, in preferred embodiments of the invention, the return reservoir has a bottom which is downwardly bulged, having a bulge continuously adjoining a jacket of the circular cylinder and having a connector for the pipe line to at least one collecting tank disposed at the center in the lowest spot of the bottom.

The device in accordance with preferred embodiments of the invention is advantageously further designed in such a way that the connector in the bottom of the return reservoir has an approximately ellipsoid opening corresponding to the intersection of the bulge of the bottom with the cross section of the pipe line. By means of this arrangement it is possible to prevent the formation of a suction vortex in the area of the connector.

There are several options for feeding the liquid media containing production residue to the return reservoir according to various contemplated preferred embodiments of the invention.

According to certain preferred embodiments the tangentially terminating pipe line contains at least one feed pump for the media to be disposed of.

According to certain preferred embodiments the pipe line has a drop which makes possible the flow of the liquid media from the collecting point to the tangential termination in the return reservoir.

Finally, according to certain preferred embodiments the return reservoir is embodied to be pressure-resistant and its interior placed under reduced pressure by means of an evacuating device connected to its upper area.

Other objects, advantages and novel features of the present invention will become apparent from the following detailed description of the invention when considered in conjunction with the accompanying drawings.

DETAILED DESCRIPTION OF THE DRAWINGS

Figure 1:
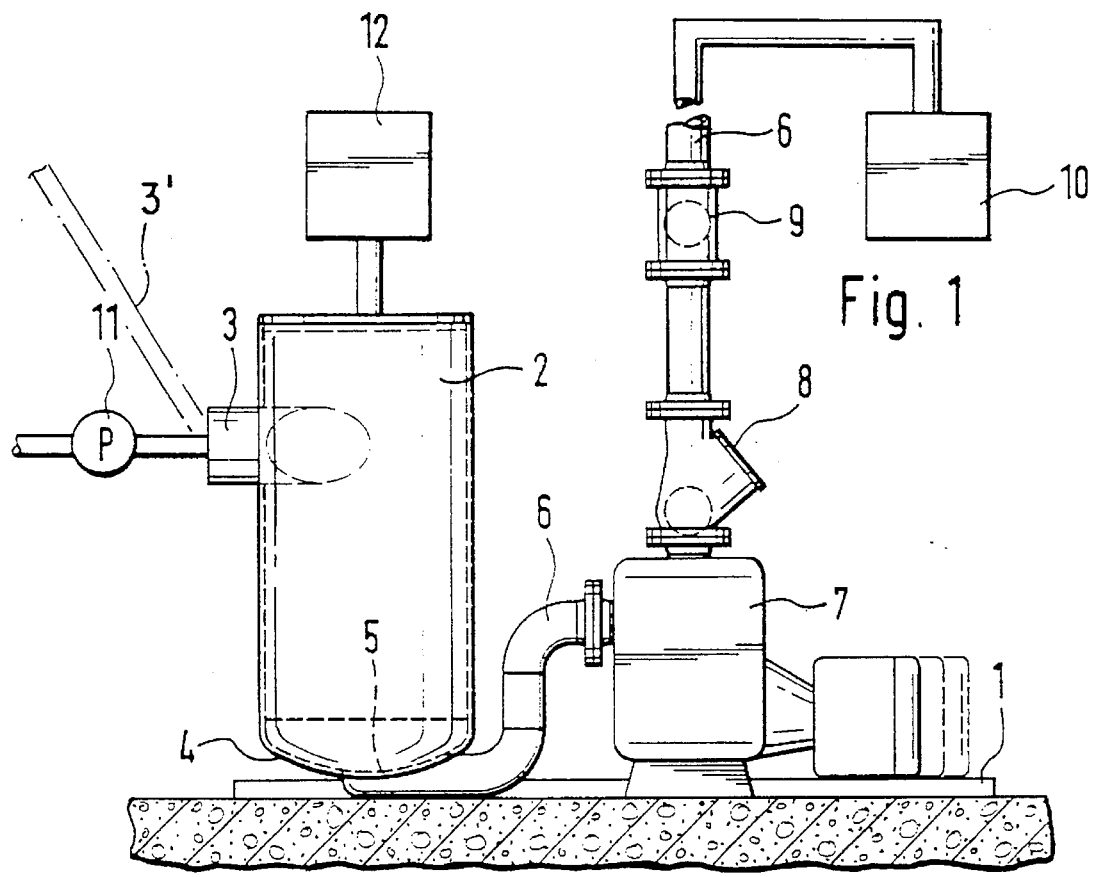
FIG. 1 is a schematic lateral view of a device for the disposal of liquid media, constructing according to a preferred embodiment of the present invention, and FIG. 2 a top view of the device of FIG. 1.
Figure 2:
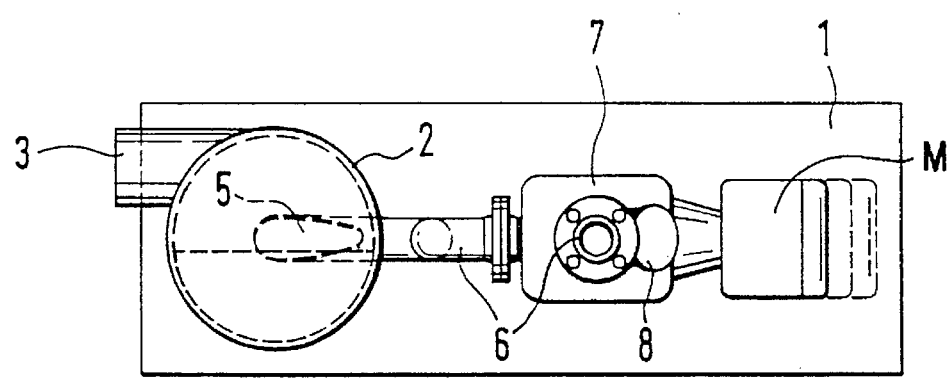

A return reservoir 2 in the shape of a circular cylinder, open at the top, is located inside a collecting trough 1. Collecting trough 1 is provided for safety and serves to collect liquid media from leakages from the device standing in the collecting trough 1. The pipe line 3 is connected to a machine, such as a lathe, from which the liquid media with a production residue originates. This liquid media in pipe line has been separated or filtered and the below described device serves to resupply that liquid media via reservoir 2, line 6 and pump 7 to the collecting tank 10, from which collecting tank 10 the liquid media can be resupplied as lubricant or other working fluid to the machine, such as a lathe.

The pipe line 3 terminates tangentially in the upper area of the return reservoir 2, through which the liquid media to be disposed of can be supplied to the return reservoir 2. The bottom 4 of the return reservoir 2 bulges downward and the bulge continuously adjoins the jacket of the circular cylinder of the return reservoir 2. In the center of the lowest point of the bottom 4, a connector 5 for a pipe line 6 is provided which leads to a collecting tank 10.

The opening of the connector 5 in the bottom 4 is approximately ellipsoid to correspond to the intersection of the bulge of the bottom 4 with the cross section of the pipe line 6. Starting from the connector 5, a return pump 7 driven by pump motor M, a ball check valve 8 and a ball valve 9 have been inserted in the direction of flow from the pipe line 6 to pipe line section 6A which leads to a collecting tank 10.

The pipe line 3 contains a feed pump 11. An alternative arrangement is depicted in dash lines in FIG. 1, showing an inclined pipe section 3' which accommodates gravity assisted supply of liquid media to the tangential inlet to the return reservoir 2.

The return reservoir 2 is embodied to be pressure-resistant, in this case the interior of the return reservoir 2 can be placed under reduced pressure by means of an evacuation device 12 connected to its upper area.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A device for the disposal of liquid media in the form of cooling-lubricating liquids containing production residue from industrial processes, wherein these media can be returned after being separated or filtered via at least one pipe line to a return reservoir and from there through pipe lines connected near the bottom of the reservoir to at least one collecting tank by means of at least one return pump, wherein the return reservoir has an approximate shape of a standing circular cylinder, in which at least one inlet pipe line supplying liquid media terminates approximately tangentially, and wherein the return reservoir has a connector at its bottom for an outlet pipe line leading to a collecting tank, said return reservoir shape and said inlet and outlet pipe lines serving to assure circulating flow of the liquid media in the return reservoir which cleans interior walls of the return reservoir and prevents deposit of production residue in the return reservoir.

2. A device in accordance with claim 1, wherein the return reservoir has a bottom which is downwardly bulged, whose bulge continuously adjoins a jacket of the circular cylinder and has the connector for outlet pipe line, said connector being disposed at the center in the lowest spot of the bottom.

3. A device in accordance with claim 2, wherein the connector in the bottom of the return reservoir has an approximately ellipsoid opening corresponding to the intersection of the bulge of the bottom with the cross section of the pipe line.

4. A device in accordance with claim 3, wherein the at least one inlet pipe line contains at least one feed pump for the media to be disposed of.

5. A device in accordance with claim 4, wherein the at least one inlet pipe line has a drop from the collecting point to the tangential termination in the return reservoir, which drop facilitates the flow of the liquid media.

6. A device in accordance with claim 4, wherein the return reservoir is embodied to be pressure-resistant and its interior can be placed under reduced pressure by means of an evacuating device connected to its upper area.

7. A device in accordance with claim 6, wherein the at least one inlet pipe line has a drop from the collecting point to the tangential termination in the return reservoir, which drop facilitates the flow of the liquid media.

8. A device in accordance with claim 3, wherein the at least one inlet pipe line has a drop from a collecting point to the tangential termination in the return reservoir, which drop facilitates the flow of the liquid media.

9. A device in accordance with claim 3, wherein the return reservoir is embodied to be pressure-resistant and its interior can be placed under reduced pressure by means of an evacuating device connected to its upper area.

10. A device in accordance with claim 3, wherein said at least one inlet pipe line consists of a single inlet pipe line.

11. A device in accordance with claim 2, wherein the at least one inlet pipe line contains at least one feed pump for the media to be disposed of.

12. A device in accordance with claim 2, wherein the at least one inlet pipe line has a drop from a collecting point to the tangential termination in the return reservoir, which drop facilitates the flow of the liquid media.

13. A device in accordance with claim 2, wherein the return reservoir is embodied to be pressure-resistant and its interior can be placed under reduced pressure by means of an evacuating device connected to its upper area.

14. A device in accordance with claim 1, wherein the at least one inlet pipe line contains at least one feed pump for the media to be disposed of.

15. A device in accordance with claim 1, wherein the at least one inlet pipe line has a drop from a collecting point to the tangential termination in the return reservoir, which drop facilitates the flow of the liquid media.

16. A device in accordance with claim 15, wherein said at least one inlet pipe line consists of a single inlet pipe line.

17. A device in accordance with claim 16, wherein the return reservoir is embodied to be pressure-resistant and its interior can be placed under reduced pressure by means of an evacuating device connected to its upper area.

18. A device in accordance with claim 1, wherein the return reservoir is embodied to be pressure-resistant and its interior can be placed under reduced pressure by means of an evacuating device connected to its upper area.

19. A device in accordance with claim 1, wherein said at least one inlet pipe line consists of a single inlet pipe line.

* * * * *